Sept. 21, 1965 C. A. GONGWER 3,206,976
TURBULENCE DETECTOR
Filed Feb. 23, 1962
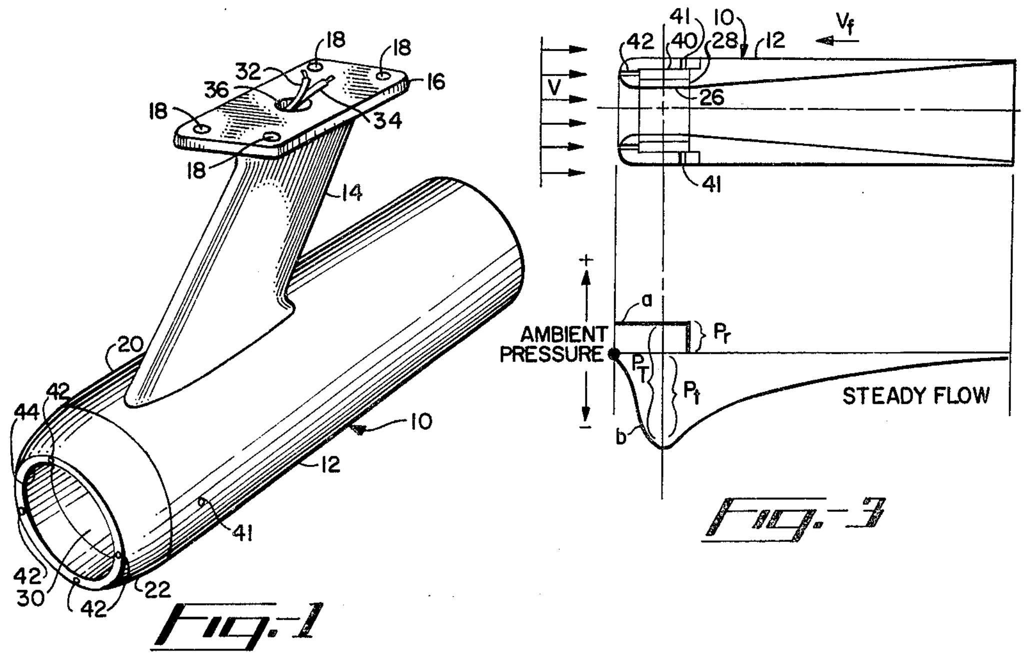
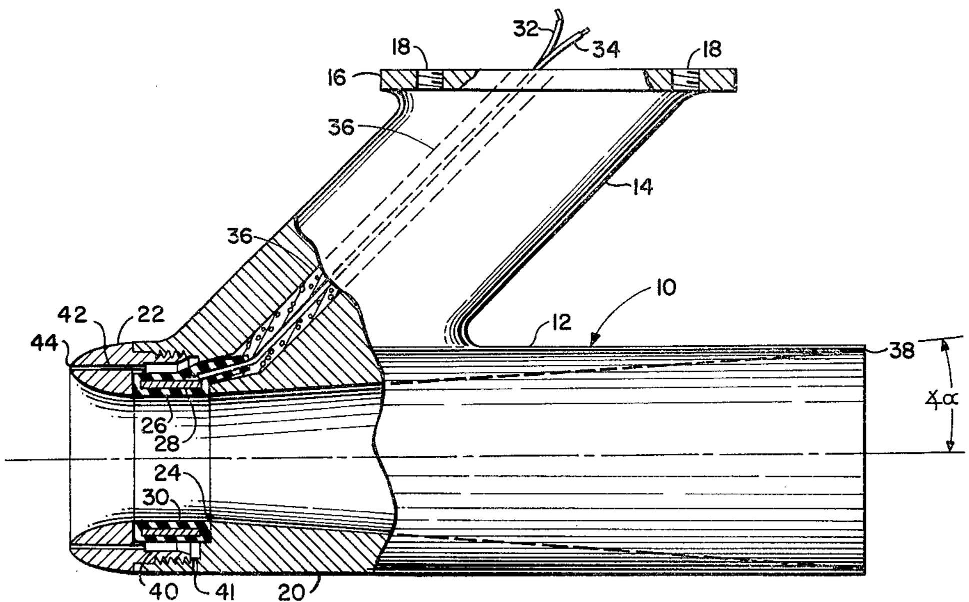
INVENTOR.
CALVIN A. GONGWER
BY
ATTORNEY United States Patent Office 3,206,976 Patented Sept. 21, 1965

3,206,976
TURBULENCE DETECTOR

Calvin A. Gongwer, Glendora, Calif., assignor to Aerojet-General Corporation, Azusa, Calif., a corporation of Ohio Filed Feb. 23, 1962, Ser. No. 175,097
8 Claims. (Cl. 73—213)

This invention relates to an instrument for detecting turbulence in a fluid medium and, in particular, to an instrument for sensing small velocity fluctuations due to ambient turbulence in a fluid medium.

In referring to the term turbulence it should be understood that reference is made to the principal elements of turbulent motion in a fluid medium which are too great to be attributed solely to molecular activity, namely, the vortices and whirls and associated fluid particle velocity fluctuations which are characteristic of turbulent flow.

Heretofore turbulence in a fluid has been sensed by hot-wire or hot-film anemometer-type instruments which have been employed to obtain data relative to the details of microturbulence required in the experimental verification of modern statistical theories of turbulence. However, these instruments are somewhat complex and limited for general use. The size of the sensors are deliberately made as small as possible. Consequently, they are fragile, require complex electronic circuits for data read-out and the elements tend to lose their calibration due to surface contamination. It is also known in the art that a microphone may be fed by the ram pressure of a Pitot tube when moved at high velocity through the air to sense atmospheric turbulence. The sound output of the microphone is a measure of atmospheric turbulence since it indicates the rate of pressure variation resulting from small velocity fluctuations in the fluid medium through which the Pitot tube passes. However, the Pitot tube-microphone type instrument must be moved at very high velocities in order to obtain sufficient sensitivity to very small velocity fluctuations.

It is, therefore, the principal object of the present invention to provide a turbulence detector which provides a measurement of turbulence in a fluid medium at a sensitivity heretofore unobtainable.

Another object of the invention is to provide a detector which senses the mean velocity fluctuations in a fluid medium over an enlarged area to, therefore, provide a greater area sampling of the characteristics of turbulence not obtainable by prior art devices.

A further object of the invention is to provide a new and improved turbulence detector having novel means for transforming fluid velocity fluctuations into electrical signals.

In its principal aspect, the present invention comprises a venturi tube having a throat, and a cylindrical transducer element located at the throat of the tube. The transducer element is preferably of the piezoelectric type which produces electrical energy in proportion to stresses applied to it. The transducer element is stressed by pressure variations in a fluid medium resulting from small velocity fluctuations or, in other words, turbulence in the fluid medium. The electrical energy thus created may be amplified and recorded and will indicate the magnitude and frequency of pressure variations in the fluid medium thus indicating the intensity and scale of turbulence existing in the fluid medium. Since the transducer element is located at the throat of the venturi tube, as is well-known in the art, it will sense variations in pressure in the fluid on an order of five or more times greater than that which would be obtained if the venturi configuration were not provided. Means are also provided so that the transducer element may sense ram pressure variations at the front edge of the venturi tube so that the magnitude of the output of the transducer element will be even more greatly magnified.

Other objects, aspects, and advantages will become apparent from the following description in connection with the accompanying drawing, wherein:

FIGURE 1 is a perspective view of the turbulence detector in accordance with the present invention.

FIGURE 2 is an enlarged partial longitudinal section of the detector shown in FIGURE 1.

FIGURE 3 is a schematic showing of the structure of the turbulence detector and a graph showing the pressures sensed by the transducer element at the front edge of the venturi tube and along the venturi surface thereof.

Referring now to FIGURES 1 and 2 in detail, the turbulence detector, generally designated by numeral 10, includes a venturi tube 12 having a mounting strut 14 extending from the upper portion thereof. On top of the mounting strut there is provided a mounting flange 16 having a plurality of holes 18 by which the turbulence detector may be mounted to a test vehicle which will carry the turbulence detector through the fluid. The venturi tube 12 is divided into two sections, a main body 20 and a nose piece 22. As seen in FIGURE 2 the nose piece is screw threaded to the main body portion 20. The nose piece 22 and the main body 20 are machined so that when assembled they provide an annular groove 24 which opens to the throat 26 of the venturi tube.

A cylindrical transducer element 28 is positioned in the annular groove 24 and is co-axial with the venturi tube 12. The transducer element is preferably of the piezoelectric type and may be formed of either barium titanate, lead zirconate, or any other suitable material. However, it is to be understood that any transducer element may be provided which is capable of translating pressure variations into electrical energy impulses. The transducer element 28 is completely enclosed by compressive sealing means 30, such as rho-c rubber, which has a minimum interference with the transmission of the pressure fluctuations between the fluid and the transducer element and provides protection against contamination for the transducer electrodes, not shown, and the leads therefrom 32 and 34. The sealing means 30 also provide a thermal insulation for the transducer element to minimize temperature effects and provide a pressure seal for the faces of the transducer element. It is important, however, that the internal surface of the sealing means 30 be smooth and continuous with the surface of the venturi tube 12 so that the full venturi effect of the fluid flowing over the surface will be maintained and self-noise minimized. The leads 32 and 34 extending from the transducer element 28 pass through a passage 36 in the mounting strut 14 and protrude through the top of the mounting flange 16 where they may be attached to appropriate recording instruments to be described hereinbelow. It is desirable that passage 36 be filled with a waterproof potting compound in order to eliminate pressure communication to the transducer 28 through the passage.

Since the internal surface of the compressive sealing means 30 must have the same diameter of the throat 26 of the venturi tube it can be appreciated that the internal diameter of the cylindrical transducer element 28 must be at least as great as the diameter of the throat 26. As fluid passes through the venturi tube 12 and the throat 26 thereof it can be appreciated that the under-pressure caused by the venturi effect will tend to constrict the cylindrical transducer element 28 thereby creating electrical energy in the transducer element. As mentioned before the venturi tube 12 is used since it magnifies pressure variations in the fluid engaged thereby. As explained at page 95 et seq. of the book, "Fluid Mechanics," by R. A. Dodge and M. J. Thompson, published by McGraw Hill Book Co., 1937 Edition, the venturi tube should be designed so that the angle between the axis and the wall of the tube, indicated by $\alpha$ in FIGURE 2 of the drawing, is preferably in the range from about 3° to about 4°. Such design will provide an optimum venturi configuration which will provide a magnification of fluid pressure variations at the throat in the order of 5 or more times greater than that at the front edge of the venturi tube 12. Therefore, the pressure variations sensed by the transducer element 28 are greatly magnified over that possible by prior art devices. Also, the pressure variations sensed by the transducer are not merely at a pin point, as in the case of a hot wire anemometer, but instead, the area of fluid sample includes all the area engaged by the front edge 44 of the venturi tube 12. Therefore, the detector senses the mean fluid velocity fluctuations over the entire front surface of the venturi tube thereby providing macro-analysis of the turbulent structure of the fluid.

The nose piece 22 of the venturi tube is also provided with an annular channel 40 which surrounds the rubber 30 enclosing transducer element 28. This channel is vented to the ambient pressure through at least two openings 41, only one being seen in FIGURE 2. Four passages 42 extending in an axial direction provide flow communication between the front edge of the venturi tube 12 and the annular channel 40. Although there are four of such passages illustrated in FIGURE 1 it is appreciated that any number of passages 42 may be provided and, preferably, they should be equally spaced around the circumference of the front edge 44 of the tube 12. By these passages, ram pressure variations at the front edge 44 of the venturi tube will be transmitted to the outer surface of the transducer element 28 and will actuate the element in the same direction as it is actuated by the under-pressure variations at the throat of the venturi tube, thereby increasing the magnitude of the electrical output thereof.

In order to operate the detector 10 it is important that it be moved at a significant and steady velocity through the fluid under investigation, it being appreciated, however, that the fluid medium may instead be moved relative to the detector. As stated above, ram pressure variations at the front edge 44 of the venturi tube are communicated to the transducer element 28 through passages 42 and variations in under-pressure at the throat 26 of the venturi tube are also sensed by the element 28. As mentioned before, these variations in fluid pressure are a direct consequence of small velocity fluctuations characteristic of the ambient turbulence in the fluid engaged by the detector. These pressure variations cause the transducer element 28 to either constrict or expand in a radial or hoopwise direction. The element acts as an electrical generator when subjected to those rapidly varying applied forces and therefore will produce an electro motive force (hereinafter referred to as E.M.F.) at its electrodes proportional to the resulting hoop stresses induced therein. The voltage output may be amplified and recorded by an oscillograph or any other suitable recording means. It will indicate the magnitude and frequency of the pressure variations sensed by the transducer element 28. By proper calibrations the magnitude and frequency of the pressure fluctuations may be transcribed to indicate the actual changes in velocity and therefore the measure of turbulent activity in the fluid medium being investigated.

In order to describe the principles of the operation of the detector more fully the following is presented to explain the governing physical relationship as well as the instrument response characteristics under specific operating conditions.

Referring now to FIGURE 3 there is shown a schematic drawing of the turbulence detector 10 and a graph therebelow showing curves *a* and *b* which represent differential fluid pressure sensed by the transducer element

28 when the detector moves relative to an undisturbed fluid medium. The detector is assumed to be moving at a steady velocity indicated by $V_f$ in FIGURE 3 while the relative velocity field is indicated by constant velocity vectors V. Under these ideal steady flow conditions, where the velocity of the fluid medium is assumed to be zero, the ram pressure $P_r$ is constant and is defined by the expression:

$$P_r = \tfrac{1}{2}\rho V^2$$

where $\rho$ is the density of the fluid under investigation, and V is the relative velocity. The ram pressure is that which is communicated through passages 42 to the transducer element 28 and is indicated in FIGURE 3 by the curve *a*. The underpressure at the venturi throat 26 is indicated as having magnitude $P_t$ and is defined by the expression:

$$P_t = K[\tfrac{1}{2}\rho V^2]$$

where K is of the order of 5 based on an optimum venturi configuration as explained hereinabove. The underpressure along the surface of the venturi tube 12 is indicated by curve *b* in the graph in FIGURE 3.

As before mentioned, the total E.M.F., output of the transducer element 28 is directly proportional to the rate at which the element is stressed. As a consequence, the general changes in forward velocity of the detector 10 that would result from it being towed by or attached to a test vehicle will not be indicated since the rate of velocity change is comparatively very slow. On the other hand, the velocity fluctuations that are characteristic of turbulent flow will produce stress rates that will result in significant output signals.

Under turbulent flow conditions, where there are very small velocity fluctuations in the fluid, the rate of pressure variation caused by the small velocity fluctuations can be expressed by the formula:

$$\frac{\partial P}{\partial V} = \rho V$$

for turbulent flow. Accordingly, the ram pressure variation in the detector will be:

$$+\frac{\partial P_r}{\partial V} = \rho V$$

and the variation of the under-pressure in the venturi throat 26 will be:

$$-\frac{\partial P_t}{\partial V} = K\rho V$$

The total signal is obtained by adding the last two equations yielding:

$$\frac{\partial P}{\partial V} = (K+1)\rho V$$

since the phases of both signals are additive for the frequency range of interest.

Since the transducer element 28 senses pressure variations in the fluid which result from small velocity fluctuations it is appreciated that it is an accurate and convenient means for indicating turbulent flow in the fluid medium. It is also appreciated by referring to the graph in FIGURE 3 that the fluid pressures sensed by the transducer element 28 during steady flow of the detector 10 are cumulative as indicated by the curves *a* and *b*, $P_t$ indicating the magnitude of the total fluid pressure at the throat of the venturi tube 12. Likewise, the rate of pressure variations resulting from variations in ram pressure and under-pressure at the venturi throat 26 are cumulative or, in other words, the pressures act together to constrict the piezoelectric transducer element 28 to provide an E.M.F. output which is indicative of the state of turbulence in the fluid.

It can therefore be seen that in accordance with this invention there is provided a turbulence detector which senses pressure variations resulting from mean velocity fluctuations which are indicative of ambient turbulence in a fluid medium. These pressure variations are taken from an area sampling and are transferred into electrical output of a magnitude heretofore unobtainable which may be recorded to indicate magnitude and frequency fluctuations in velocity and therefore the turbulence in a fluid medium.

It will of course be understood that various changes can be made in the form, details, arrangement, and proportions of the various parts without departing from the spirit and scope of the invention as defined by the following claims.

What is claimed is:

1. A turbulence detector adapted for movement through a fluid medium comprising: a venturi tube having a throat, and means in operative association with said throat for sensing pressure variations resulting from small velocity fluctuations in the fluid medium in said throat, said sensing means comprising a cylindrical transducer element co-axial with said venturi tube, and the internal diameter of said cylindrical transducer element being at least as great as the diameter of said throat.

2. A turbulence detector as set forth in claim 1 wherein said cylindrical transducer element is of the piezoelectric type.

3. A turbulence detector as set forth in claim 1 and, in addition, fluid conducting means leading from the forward edge of said venturi tube to a periphery of said cylindrical transducer element.

4. A turbulence detector adapted for movement through a fluid medium comprising: a venturi tube having a throat, said throat having an annular groove therein, a cylindrical transducer element co-axial with said venturi tube and lying in said annular groove, the internal diameter of said cylindrical transducer element being at least as great as the diameter of said throat.

5. A turbulence detector as set forth in claim 4 and, in addition, said cylindrical transducer element having its outer periphery spaced from the inner periphery of said annular groove to provide an annular channel therebetween, and fluid conducting means leading from the forward edge of said venturi tube to said annular channel, whereby both ram pressure fluctuations at the front of said venturi tube and under-pressure variations at the throat of said venturi tube will be sensed by said transducer element.

6. A turbulence detector as set forth in claim 5 and, in addition, compressive sealing means in said annular groove enclosing said cylindrical transducer element.

7. A turbulence detector as set forth in claim 5 wherein said fluid conducting means includes a plurality of axially extending passages in said venturi tube, said passages being equally spaced around the forward edge of said venturi tube.

8. A turbulence detector adapted for movement through a fluid medium comprising: a venturi tube having a throat, and means in operative association with both said throat and the leading edge of said venturi tube for sensing ram pressure fluctuations at the front of said venturi tube and under-pressure variations at said throat, said sensing means comprising a transducer element producing electrical potential proportional to ram pressure variations and under-pressure variations.

References Cited by the Examiner

UNITED STATES PATENTS

| | | | |
|---|---|---|---|
| 1,311,798 | 7/19 | Bristol | 73—182 X |
| 1,635,040 | 7/27 | Fales | 73—213 X |
| 2,315,756 | 4/43 | Warner | 73—182 X |
| 2,343,281 | 3/44 | Crane | 73—178 |

FOREIGN PATENTS

| | | |
|---|---|---|
| 714,992 | 12/41 | Germany. |

RICHARD C. QUEISSER, *Primary Examiner.*

ROBERT L. EVANS, *Examiner.*